(12) United States Patent
Hinners et al.

(10) Patent No.: US 12,460,634 B2
(45) Date of Patent: Nov. 4, 2025

(54) PUMP FOR CONVEYING A FLUID

(71) Applicant: VOGELSANG GMBH & CO. KG, Essen (DE)

(72) Inventors: Thomas Hinners, Essen (DE); Jürgen Bruning, Essen (DE)

(73) Assignee: VOGELSANG GMBH & CO KG, Essen (DE)

( * ) Notice: Subject to any disclaimer, the term of this patent is extended or adjusted under 35 U.S.C. 154(b) by 0 days.

(21) Appl. No.: 18/234,441

(22) Filed: Aug. 16, 2023

(65) Prior Publication Data

US 2024/0060489 A1 Feb. 22, 2024

(30) Foreign Application Priority Data

Aug. 17, 2022 (DE) .......................... 202022104656.5

(51) Int. Cl.
*F04C 2/08* (2006.01)
*F04C 2/12* (2006.01)
*F04C 13/00* (2006.01)

(52) U.S. Cl.
CPC .............. *F04C 2/126* (2013.01); *F04C 2/086* (2013.01); *F04C 2/123* (2013.01); *F04C 13/001* (2013.01); *F04C 2240/30* (2013.01); *F04C 2240/802* (2013.01); *F04C 2240/805* (2013.01); *F04C 2270/16* (2013.01)

(58) Field of Classification Search
CPC .......... F04C 2/086; F04C 2/123; F04C 2/126; F04C 2/16; F04C 2/18; F04C 13/001; F04C 15/00; F04C 15/06; F04C 2240/30; F04C 2240/802; F04C 2240/805; F04C 2270/16; F01C 21/106
See application file for complete search history.

(56) References Cited

U.S. PATENT DOCUMENTS

| | | | |
|---|---|---|---|
| 2,848,952 | A | 8/1958 | Wakerman |
| 4,940,394 | A | 7/1990 | Gibbons |
| 5,599,176 | A | 2/1997 | Reinersmann |
| 5,695,327 | A | 12/1997 | Heinen et al. |
| 9,804,607 | B1 | 10/2017 | Coleman |
| 2002/0057979 | A1 | 5/2002 | Schofield et al. |
| 2002/0159906 | A1 | 10/2002 | Phallen et al. |
| 2008/0118383 | A1 | 5/2008 | Park |

(Continued)

FOREIGN PATENT DOCUMENTS

| | | |
|---|---|---|
| CN | 1074269694 | 12/2017 |
| DE | 20052518 | 7/1971 |

(Continued)

*Primary Examiner* — Theresa Trieu
(74) *Attorney, Agent, or Firm* — PRICE HENEVELD LLP

(57) ABSTRACT

A pump for conveying a fluid includes a casing with a casing inner wall, a pump interior, an inlet opening, an outlet opening, a displacement assembly, and a radial protective element arranged in the pump interior in order to line at least one radial section of the pump interior, the radial protective element bearing against a radial section of the casing inner wall. A fastening element is provided which can be arranged in a fastening position in which the fastening element bears against an edge of the radial protective element and in the process fastens the radial protective element in the pump interior, wherein the fastening element has a longitudinal extent which extends from a first axial end of the pump interior along a recess arranged in the casing inner wall.

27 Claims, 9 Drawing Sheets

(56) References Cited

U.S. PATENT DOCUMENTS

| | | |
|---|---|---|
| 2015/0275893 A1 | 10/2015 | Krampe et al. |
| 2017/0045046 A1 | 2/2017 | Afshari |
| 2018/0058452 A1 | 3/2018 | Yuki et al. |
| 2018/0128522 A1 | 5/2018 | Hauleitner et al. |

FOREIGN PATENT DOCUMENTS

| | | |
|---|---|---|
| DE | 2520667 | 11/1976 |
| DE | 3427282 | 1/1986 |
| DE | 9114393 | 12/1992 |
| DE | 4315413 | 11/1994 |
| DE | 29723984 | 9/1999 |
| DE | 102006018285 | 10/2007 |
| DE | 202010011626 | 10/2010 |
| DE | 202010015437 | 2/2012 |
| DE | 202018004820 | 11/2018 |
| DE | 102018008264 | 4/2020 |
| EP | 1061259 | 12/2000 |
| EP | 1519044 | 3/2005 |
| EP | 2475889 | 7/2012 |
| GB | 2429751 | 3/2007 |
| JP | S495704 | 1/1974 |
| JP | H03213688 | 9/1991 |
| JP | H07279868 | 10/1995 |
| JP | H08284855 | 10/1996 |
| JP | 2013507575 | 3/2013 |
| JP | 2015535045 | 12/2015 |
| WO | 2011049362 | 4/2011 |
| WO | 2014067988 | 5/2014 |
| WO | 2015083195 | 6/2015 |
| WO | 2016157445 | 10/2016 |

PUMP FOR CONVEYING A FLUID

CROSS-REFERENCE TO FOREIGN PRIORITY APPLICATION

The present application claims the benefit under 35 U.S.C. §§ 119(b), 119(e), 120, and/or 365(c) of German Application No. DE 202022104656.5 filed Aug. 17, 2022.

FIELD OF THE INVENTION

The present invention relates to a pump for conveying a fluid, in particular for conveying liquids containing solids. The invention also relates to a fastening element for fastening a radial protective element within a pump interior of a pump and to a protective element system for lining a radial section of a pump interior of a pump. The invention further relates to a method for fastening a radial protective element within a pump interior of a pump and to the use of a fastening element and/or of a protective element system.

BACKGROUND OF THE INVENTION

Radial protective elements, which can also be referred to as casing protection shells, inter alia, are used in particular for lining pump chambers, for example in lobe pumps. Typically, such radial protective elements can be installed in and removed from a pump optionally. Such radial protective elements are in particular used to protect the pump casing and in particular the casing inner wall from abrasion, which can occur for example as a result of solids in a liquid to be conveyed by the pump. It is known to use such radial protective elements in a pump for this purpose. It is also known to use axial protective elements, which line the axial walls of the pump casing, in addition to radial protective elements.

Typically, radial protective elements are fastened using fastening elements. The fastening elements are fastened to the casing with screws in the region of the inlet opening and in the region of the outlet opening. A disadvantage of known radial protective elements and the fastening elements provided therefor is that the fastening elements are usually exposed to the flow of the fluid and thus wear rapidly and can be damaged by foreign bodies. Moreover, the fastening elements can have a negative influence on the flow of the fluid to be conveyed. It is also possible that screws arranged inside the casing for fastening the fastening elements break off owing to the influence of foreign bodies, as a result of which the fastening elements can, for example, get into a displacement assembly of the pump, possibly causing serious damage there. The radial protective elements can then also get into the displacement assembly and likewise cause serious damage there, for example by damaging rotors. A further disadvantage of known radial protective elements is that the installation and exchange of such protective elements is typically relatively complex and also can be carried out only with difficulty owing to a limited installation space.

The invention is therefore based on the object of providing an improved solution which addresses at least one of the problems mentioned. In particular, it is an object of the invention to provide a solution with which the maintenance intervals of a pump with protective elements can be lengthened and with which installation and exchange of the protective elements is simplified.

SUMMARY OF THE INVENTION

According to a first aspect, this object is achieved by a pump having the features of described herein below. A pump for conveying a fluid, in particular for conveying liquids containing solids, is provided, comprising: a casing with a casing inner wall, a pump interior delimited by the casing inner wall, an inlet opening through which fluid can be conveyed into the pump interior, an outlet opening through which fluid can be conveyed out of the pump interior, a displacement assembly which is arranged in the pump interior and is mounted movably relative to the pump interior and is designed to cause the fluid to be conveyed along a flow direction from the inlet opening to the outlet opening, and a radial protective element arranged in the pump interior in order to line at least one radial section of the pump interior, the radial protective element bearing against a radial section of the casing inner wall.

According to the invention, a fastening element is provided, which can be arranged in a fastening position in which the fastening element bears against an edge of the radial protective element and in the process fastens the radial protective element in the pump interior, wherein the fastening element has a longitudinal extent which extends from a first axial end of the pump interior along a recess arranged in the casing inner wall.

The pump is preferably designed as a displacement pump, in particular in the form of a lobe pump or eccentric screw pump. In principle, however, other pump designs such as centrifugal pumps can also be considered. The fluid to be conveyed can pass through the inlet opening into the pump interior and through the outlet opening out of the pump chamber.

It is preferred for the inlet opening and the outlet opening to be exchangeable in function by reversing the conveying direction, so that the previous inlet opening becomes the outlet opening, and the previous outlet opening becomes the inlet opening. The inlet opening and/or the outlet opening is preferably designed as an opening in the pump casing, that is, a part of the pump casing.

A displacement assembly means an assembly which can cause the fluid to be conveyed in the pump interior from the inlet opening to the outlet opening by means of a movement of the displacement assembly. The displacement assembly can for example comprise or consist of two rotors of a lobe pump, which are arranged in the pump interior and are each mounted rotatably about a rotational axis. It is particularly preferred when the displacement assembly can execute a rotary movement.

Preferably, the pump has a drive device which is designed to drive the displacement assembly. It is particularly preferred when the drive device can rotate the displacement assembly.

The flow direction means in particular the direction along the flow path covered by the fluid, when it is conveyed by the pump, from the inlet opening to the outlet opening.

Preferably, the longitudinal extent of the fastening element extends in an axial direction.

The axial direction means in particular the direction running transversely to the flow direction and from a first axial side wall of the pump to a second axial side wall of the pump. A radial direction accordingly means in particular a direction arranged orthogonally to the axial direction, in particular starting from a rotational axis of the displacement assembly.

The radial protective element is preferably designed as a curved sheet, which particularly preferably has a circular arc shape in cross section. The radial protective element preferably has a curved shape corresponding to the shape of the radial section of the casing inner wall of the pump interior. The radial protective element preferably extends in the axial direction along the entire pump interior from the first axial end of the pump interior to the second axial end of the pump interior.

The fastening element can preferably be arranged in the fastening position, wherein in the fastening position the fastening element bears against an edge of the radial protective element and in the process fastens the radial protective element in the pump interior.

The fastening element is preferably rod-shaped, wherein the longitudinal extent of the fastening element is greater than the diameter of the fastening element by a multiple, in particular at least twice or at least three times.

The fastening element extends along the casing inner wall and along the recess in the casing. The fastening element is preferably arranged in the recess in the casing. In particular, the fastening element extends inside the recess in the casing. The fastening element is preferably arranged in the recess such that the fastening element is form-fittingly connected to the casing.

The recess preferably has an inner diameter which is somewhat greater than the outer diameter of the fastening element. The recess preferably has an opening extending along the recess towards the pump interior, wherein this opening is preferably smaller in the direction transverse to the axial direction than the inner diameter of the recess and/or than the cross-sectional diameter of the fastening element. As a result, it is particularly advantageously possible for the fastening element to be held form-fittingly in the recess and to be movable out of the pump only in the axial direction.

The fastening element preferably extends in the axial direction from the first axial end of the pump interior. The first axial end of the pump interior means in particular one of the two lateral ends of the pump interior which laterally delimit the pump interior. Preferably, the first axial end is formed by a side, facing the pump interior, of a side wall which can be connected detachably to the rest of the casing. Such a side wall is used in particular to laterally open and close the casing. Such a side wall can in particular also be referred to as a cover, wherein the cover is preferably arranged opposite the drive device. The components arranged in the pump interior, such as the displacement assembly, radial protective element, and fastening element, can thus preferably be removed laterally from the pump interior of the pump and inserted laterally into the pump interior of the pump when the side wall is removed. It is thus in particular possible for the components to be removed from the pump interior remotely from the drive, that is, backwards as viewed from the drive device.

A first advantage of such a pump consists in that the fastening element can be removed from the pump laterally, in particular remotely from the drive, or backwards as viewed from the drive device. This is achieved in a particularly advantageous manner in that the fastening element extends to the first axial end of the pump interior. As a result, the fastening element can be installed in the pump and exchanged much more simply than is possible with known fastening elements. As a result, it is particularly advantageously not necessary in particular to work in the pump interior or to reach into the pump interior in order to install and exchange the fastening element. The installation and exchange of the fastening element and of the radial protective element can be carried out outside of the pump interior.

A further advantage consists in that it is particularly advantageously possible that elements arranged in the pump interior, in particular the displacement assembly, do not have to be removed from the pump interior in order to exchange the radial protective elements and the fastening elements. As a result, a simpler and faster installation of the radial protective elements with fewer errors can be achieved. A simpler and faster exchange of the radial protective elements with fewer errors can also be achieved thereby.

A further advantage consists in that, when such fastening elements are used, they are not arranged in the flow path and/or cannot negatively influence the flow of the fluid. This is achieved in a particularly advantageous way in that the fastening element is arranged along the recess in the casing and precisely not in the region of the inlet opening or in the region of the outlet opening.

A further advantage consists in that no screws are necessary to fasten the fastening elements in the pump interior or in the region of the inlet opening or in the region of the outlet opening. As a result, a situation can particularly advantageously be avoided in which screws can influence the flow of the fluid and/or in which screws break off and cause damage in the pump interior, for example as a result of solids.

According to a particularly preferred embodiment, it is provided for the longitudinal extent of the fastening element to extend along the entire pump interior from the first axial end of the pump interior to a second axial end of the pump interior opposite the first axial end.

It is particularly preferred for the longitudinal extent of the fastening element to be arranged in an angle range of 0° to at most 5°, preferably at most 3°, particularly preferably at most 2°, relative to an axial direction running transversely to the flow direction, wherein the recess preferably extends parallel to the longitudinal extent of the fastening element.

Preferably, the longitudinal extent of the fastening element is arranged at an angle of 0° relative to the axial direction. This means in particular that the longitudinal extent of the fastening element and the axial direction are parallel.

With an angle deviating from 0° between the longitudinal extent of the fastening element and the axial direction, the longitudinal extent and the axial direction are in particular not parallel but preferably oriented obliquely to one another by the corresponding angle.

It is particularly preferred for the longitudinal extent of the fastening element to extend in an axial direction running transversely to the flow direction.

Preferably, the recess extends in the axial direction.

It is particularly preferred for the edge of the radial protective element to be arranged in an angle range of 0° to at most 5°, preferably at most 3°, particularly preferably at most 2°, relative to the axial direction.

Preferably, the edge of the radial protective element extends parallel to the longitudinal extent of the fastening element.

It is particularly preferred for the fastening element to be connectable to the casing detachably, in particular by means of a screw connection, and to be movable out of the pump, and in particular out of the recess in the casing, in the axial direction when in a non-screwed state.

Preferably, the fastening element is form-fittingly connected to the recess in the casing transversely to the axial direction. The recess is preferably open towards the pump interior. The recess can be groove-like, for example.

It is particularly preferred for the fastening element to be form-fittingly connected to the radial protective element, wherein the fastening element preferably has an elongate depression along its longitudinal extent, said depression being designed to receive the edge of the radial protective element and thereby to produce a form-fitting connection to the radial protective element.

The longitudinal extent of the fastening element preferably corresponds to the depth of the pump interior, that is, the distance in the axial direction between the axial casing inner walls or the distance between the axial casing inner wall and the inner wall of the detachable side wall. The longitudinal extent of the fastening element can preferably also have a length somewhat smaller or somewhat greater than the depth of the pump interior, that is, the distance in the axial direction between the axial casing inner walls or the distance between the axial casing inner wall and the inner wall of the detachable side wall.

Preferably, the fastening element and the radial protective element engage in one another such that a form-fitting connection is produced. As a result, the radial protective element is preferably held on a radial section of the casing inner wall in the pump chamber, in the position provided for the radial protective element, such that the radial protective element in particular cannot move from the casing inner wall in the direction of the displacement assembly.

It is particularly preferred for the fastening element to be connected to the casing by means of at least one screw, wherein the at least one screw runs through a casing wall of the casing to the fastening element, wherein the fastening element is preferably movable in the direction of the edge of the protective element by means of the at least one screw, as a result of which the fastening element exerts a clamping force on the radial protective element, wherein the longitudinal axis of the at least one screw is preferably arranged orthogonally to the longitudinal extent of the fastening element.

With such a screw connection, the fastening element can particularly advantageously be fastened from outside the pump, and a clamping force can be applied to the radial protective element with the fastening element. The fastening element can thus also be detached from outside the pump without the need to reach into the pump chamber.

Preferably, the fastening element can be moved in the direction of the radial protective element within the recess in which the fastening element is arranged, by tightening the screw.

This is preferably made possible by a clearance fit between the recess and the fastening element.

It is particularly preferred for the fastening element to be movable by means of the at least one screw between the fastening position, in which the fastening element exerts a clamping force on the radial protective element, and a release position, in which the fastening element does not exert any clamping force on the radial protective element.

In the fastening position, the fastening element is preferably fastened to the casing with at least one screw, wherein the fastening element then cannot be displaced in the axial direction and in particular cannot be removed from the pump in the axial direction. In the release position, the fastening element is preferably not screwed to the casing, so that in the release position the fastening element can be removed from the pump in the axial direction, in particular when the side wall of the pump is removed for this purpose.

It is particularly preferred for the fastening element to have a bore which extends through the fastening element along the longitudinal extent of the fastening element.

It can also be provided for the bore to extend through the fastening element obliquely to the longitudinal extent.

Preferably, a fastening screw is arranged in the bore in the fastening element, said fastening screw being connectable and/or connected, in particular detachably connected, to the casing, in particular to a blind bore which is arranged in an axial casing inner wall and has an internal thread.

By means of such a fastening screw, the fastening element can particularly advantageously be connected to the casing inside the pump without the need for screws which pass through the casing. As a result, seals along such screws passing through the casing can advantageously also be omitted.

It is further particularly preferred for the fastening element to have preferably along its longitudinal extent at least one, preferably two elongate depressions, which are each designed to receive an edge of the radial protective element and thereby to produce a form-fitting connection to the radial protective element.

Preferably, the elongate depressions extend in an angle range of 0° to at most 5°, preferably at most 3°, particularly preferably at most 2°, relative to the longitudinal extent of the fastening element.

Particularly preferably, the elongate depressions extend parallel to the longitudinal extent of the fastening element. Preferably, the depressions also run parallel to the axial direction.

An advantage resulting from two elongate depressions in the fastening element consists in that the fastening element can thereby be introduced into different recesses in the casing in order to fasten a radial protective element. The fastening element can then preferably bear either with the first elongate depression or with the second elongate depression against the edge of a radial protective element and exert a clamping force on the radial protective element.

It is even further preferred for the fastening element to have a substantially circular cross section with at least one notch which is formed by the elongate depression, preferably with two notches which are formed by the elongate depressions and in particular are arranged mirror-symmetrically.

Preferably, such a notch means a cross-sectional section in which the fastening element has an indentation which is formed by the elongate depression. Preferably, the notch has an acute angle so that the elongate depression can hold the edge of the radial protective element securely and a secure form-fitting connection therebetween can be produced.

It is further preferred when the pump comprises a second fastening element, which extends in the axial direction from the first axial end of the pump interior along a second recess arranged in the casing inner wall, wherein the fastening elements are preferably arranged parallel and/or designed identically.

In addition to such radial protective elements, axial protective elements can also be arranged in the pump chamber. Such axial protective elements are used in particular to line the axial sides of the casing inner wall and thus to protect them from damage.

It is particularly preferred for the second fastening element to be connectable to the casing detachably, in particular by means of a screw connection, and in a non-screwed state to be movable out of the pump, and in particular out of the second recess in the casing, in the axial direction, wherein the second fastening element is form-fittingly connected to the radial protective element, wherein the second fastening element preferably has an elongate depression along its longitudinal extent, said elongate depression being designed to receive a second edge of the radial protective element and thereby to produce a form-fitting connection to the radial protective element.

Preferably, the second fastening element is connected to the casing by means of a screw connection. The second fastening element is preferably designed like the first fastening element described here in detail.

Furthermore, it is particularly preferred for the pump to have two radial protective elements, wherein preferably a first radial protective element is arranged in a first radial region of the pump chamber, and a second radial protective element is arranged in a second radial region of the pump chamber, wherein each of the protective elements is fastened in the pump interior with two fastening elements.

Preferably, the pump comprises four fastening elements and two radial protective elements, wherein the radial protective elements each have two edges which run in the axial direction and are designed to be received in the elongate depressions of the fastening elements. Each of the two radial protective elements can thus be fastened by means of two fastening elements each.

By means of two such radial protective elements, it is possible in a particularly advantageous way for the radial regions of the pump interior and/or the radial regions of the casing inner wall to be lined and thus protected from damage.

It is also particularly preferred for the pump to be a lobe pump and for the displacement assembly to comprise a first rotor, which is mounted rotatably about a first rotational axis within the pump interior, and a second rotor, which is mounted rotatably about a second rotational axis within the pump interior, wherein the first rotor and the second rotor engage in one another between the first rotational axis and the second rotational axis, wherein the first rotational axis and the second rotational axis are arranged parallel to the axial direction.

Preferably, the rotors mesh with one another. The rotors are preferably multi-lobed, in particular two-lobed, three-lobed, or four-lobed. The use of the radial protective elements described here in conjunction with the fastening elements described here in such a lobe pump is particularly advantageous because lobe pumps are often used for conveying liquids containing solids, in which case, because of the solids, reliable lining and reliable protection of the casing inner wall from damage by the solids can be particularly important.

According to a further aspect, the object mentioned at the outset is achieved by a fastening element for fastening a radial protective element within a pump interior of a pump, in particular a pump as described here, wherein the fastening element is rod-shaped and has a substantially circular cross section with at least one notch, formed by an elongate depression, for receiving an edge of a radial protective element, preferably with two notches, formed by the elongate depressions and in particular arranged mirror-symmetrically, for receiving an edge of a radial protective element.

Preferably, the elongate depression is designed to receive an edge of the radial protective element and to produce a form-fitting connection between the depression and the edge.

According to a further aspect, the object mentioned at the outset is achieved by a protective element system for lining a radial section of a pump interior of a pump, in particular a pump as described here, comprising at least two, preferably four, fastening elements according to the preceding claim and at least one radial protective element, preferably two radial protective elements, wherein the radial protective element has two edges which run in the axial direction and are designed to be received in the elongate depressions in the fastening elements.

Particularly preferably, the protective element system comprises four fastening elements and two radial protective elements, wherein the radial protective elements each have two edges which run in the axial direction and are designed to be received in the elongate depressions in the fastening elements. Each of the two radial protective elements can thus be fastened by means of two fastening elements each. Preferably, the protective element system comprises two axial protective elements, which are designed to line and protect the axial, that is, lateral, inner walls of the pump interior. With radial and axial protective elements, the entire pump interior can advantageously be lined and thus the entire casing inner wall can be protected.

It is particularly preferred when the notch formed by the elongate depression has an opening angle of less than 90°, preferably less than 75°, particularly preferably of 45°, in cross section, and/or the edges of the radial protective element have an edge angle of less than 90°, preferably less than 75°, particularly preferably of 45°, in cross section, wherein the opening angle and the edge angle are preferably equal, wherein the edges of the radial protective element can be arranged in the elongate depression to produce a form-fitting connection.

An advantage of such an acute opening angle, which is in particular less than 90°, is that the edge can be held securely in the elongate depression owing to this geometric shape and a form-fitting connection can be produced.

According to a further aspect, the object mentioned at the outset is achieved by a method for fastening a radial protective element within a pump interior of a pump, in particular a pump as described here, comprising the following steps: providing a pump, in particular a pump as described here, the pump comprising a casing with a casing inner wall, a pump interior delimited by the casing inner wall, an inlet opening through which fluid can be conveyed into the pump interior, an outlet opening through which fluid can be conveyed out of the pump interior, preferably a displacement assembly which is arranged in the pump interior and is mounted movably relative to the pump interior and is designed to cause the fluid to be conveyed along a flow direction from the inlet opening to the outlet opening; arranging a radial protective element within the pump interior in order to line at least one radial section of the pump interior so that the radial protective element bears against a radial section of the casing inner wall; and introducing a fastening element into a recess in the casing, said recess running along the casing inner wall and preferably extending in an axial direction running transversely to the flow direction so that the fastening element extends in the axial direction from a first axial end of the pump interior and the fastening element bears against an edge of the radial protective element.

It is preferred when the method steps are carried out in the order stated here.

According to a particularly preferred embodiment, the method comprises: connecting the fastening element to the casing by means of at least one screw, wherein the at least one screw runs through a casing wall of the casing to the fastening element and/or through a bore along a longitudinal extent of the fastening element; and preferably moving the fastening element by means of the at least one screw in the direction of the edge of the protective element, as a result of which the fastening element exerts a clamping force on the radial protective element.

It is preferred when the method steps are carried out in the order stated here. To take out or remove the fastening element and/or the radial protective element, they are preferably removed in a suitable order for this.

It is particularly preferred for the fastening element to extend, preferably in the axial direction, along the entire pump interior from the first axial end of the pump interior to a second axial end of the pump interior opposite the first axial end, wherein the fastening element is preferably form-fittingly connected to the radial protective element, and wherein the fastening element preferably has an elongate depression along its longitudinal extent, said depression being designed to receive the edge of the radial protective element and thereby to produce a form-fitting connection to the radial protective element.

Preferably, the method comprises pulling the fastening element out of the recess in the casing, preferably in the axial direction, in particular by means of a pin extractor.

It is preferred for the fastening element to be removable by means of a commercially available pin extractor, in particular a slide hammer. Preferably, all the provided fastening elements are removable by means of a commercially available pin extractor, in particular a slide hammer. This particularly advantageously means that the fastening elements can be removed easily even if there is dirt in the region of the fastening elements.

Preferably, the method comprises removing the radial protective element, and preferably further protective elements, from the pump interior, in particular in the axial direction.

Preferably, the method comprises removing the displacement assembly from the pump interior, in particular in the axial direction.

Preferably, the displacement assembly can be installed in the pump interior and also removed. Removal of the displacement assembly from the pump interior can be advantageous in particular when the pump is to be cleaned before installation during repair, since better cleaning is then possible. Moreover, it can be advantageous when the displacement assembly is removed from the pump interior in order to be better able to install the protective elements in the pump interior with the displacement assembly removed.

According to a further aspect, the object mentioned at the outset is achieved by the use of a fastening element as described here and/or a protective element system as described here in a lobe pump designed to convey liquids containing solids.

Such a use of the radial protective elements described here in conjunction with the fastening elements described here in a lobe pump which conveys liquids containing solids is particularly advantageous because firstly the casing inner wall can be protected reliably from the influence of the solids and secondly damage to the displacement assembly by the fastening elements and/or the radial protective elements can be reliably prevented, since they cannot pass to the rotors and thus cannot damage the rotors.

For the advantages, variants, and details of the various aspects of the solutions described here and their possible developments, reference is also made to the description of the corresponding features, details and advantages of the other aspects and their developments.

BRIEF DESCRIPTION OF THE DRAWINGS

Preferred exemplary embodiments are explained by way of example using the attached figures. In the figures.

DETAILED DESCRIPTION OF THE EMBODIMENTS

In the Figures, identical or substantially functionally identical or similar elements are indicated with the same reference signs.

Figure 1:
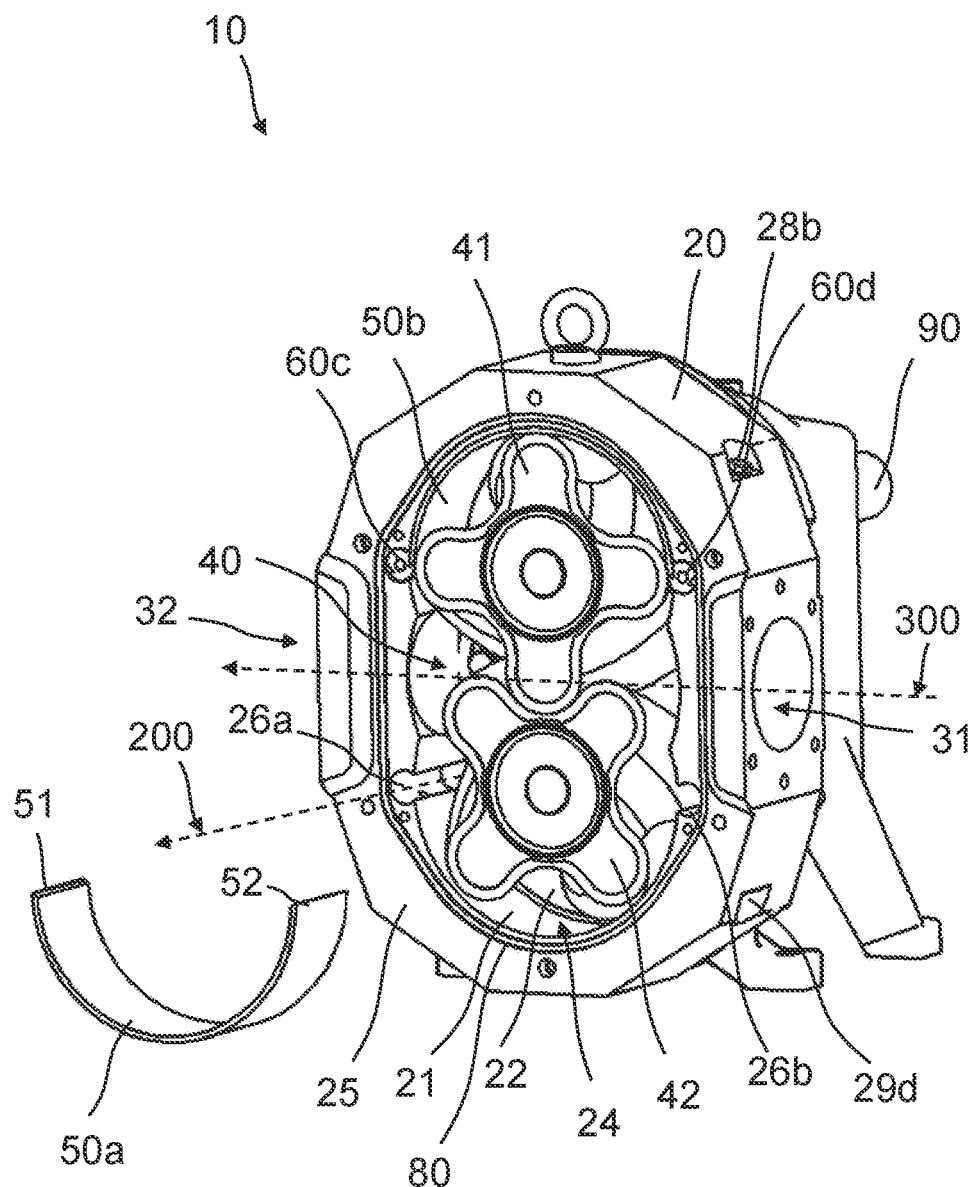
FIG. 1 shows a schematic diagram of a pump and a removed radial protective element.

FIG. 1 shows a schematic diagram of a pump 10 and a removed radial protective element 50a. The pump 10 is designed to convey a fluid, specifically to convey liquids containing solids. The pump 10 comprises a casing 20 with a casing inner wall, which has a lower radial section 21, an upper radial section, a first axial section 22 and a second axial section. The pump interior 24 is delimited by the casing inner wall.

Fluid can be conveyed through an inlet opening 31 into the pump interior 24 and from there to an outlet opening 32 along a flow direction 300. In the pump interior 24 there is a displacement assembly 40, which is mounted movably relative to the pump interior 24. In the exemplary embodiment shown here, the pump 10 is designed as a lobe pump and comprises a first rotor 41 and a second rotor 42, which are mounted rotatably and engage in one another. The fluid can be conveyed along a flow direction 300 from the inlet opening 31 to the outlet opening 32 by rotation of the rotors 41, 42. The rotors 41, 42 mesh with one another. In the exemplary embodiment shown here, the rotors 41, 42 are each designed with four lobes, but a different number and/or shape of the conveying elements can also be used. The rotors 41, 42 can be driven with a drive device 90 to convey the fluid.

In the pump interior 24 there is a radial protective element 50b for lining the upper radial section of the pump interior 24, the radial protective element 50b bearing against a radial section of the casing inner wall. This radial protective element 50b is fastened in the pump interior 24 by means of two fastening elements 60c, 60d, which each bear against an edge of the radial protective element 50b. A clamping force acts on the radial protective element 50b from each of the fastening elements 60c, 60d. The fastening elements 60c, 60d each extend along the casing inner wall from a first axial end of the pump interior 24 within recesses which run in the axial direction 200 or parallel to the axial direction 200 and thus orthogonally to the flow direction 300.

The fastening elements are fastened with screws 28b, 28d which run through the casing and are connected to the fastening elements 60b, 60d. The fastening elements 60a and 60c are likewise fastened by means of screws which run through the casing. By means of such screws, the fastening elements 60a, 60b, 60c, 60d can be moved in the direction of the radial protective elements 50a, 50b and thus exert a clamping force on the radial protective elements so that the radial protective elements can be fastened securely in the pump interior.

A radial protective element 50a is removed from the pump 10, for example for maintenance or before installation. The radial protective element 50a has two edges 51, 52 which are designed to produce a form-fitting connection to elongate depressions present in fastening elements which can be arranged in the recesses 26a, 26b.

A seal 80 is arranged on a casing side section 25. A side wall (not shown) is fastened to this casing side section 25 and the seal 80 in order to close the pump 10, that is, to close the pump interior 24. So that all the components shown in the pump interior 24 are visible, the pump is shown without a side wall in each of the states shown here. Such a side wall is of course fastened to the pump 10 during operation of the pump.

Figure 2:
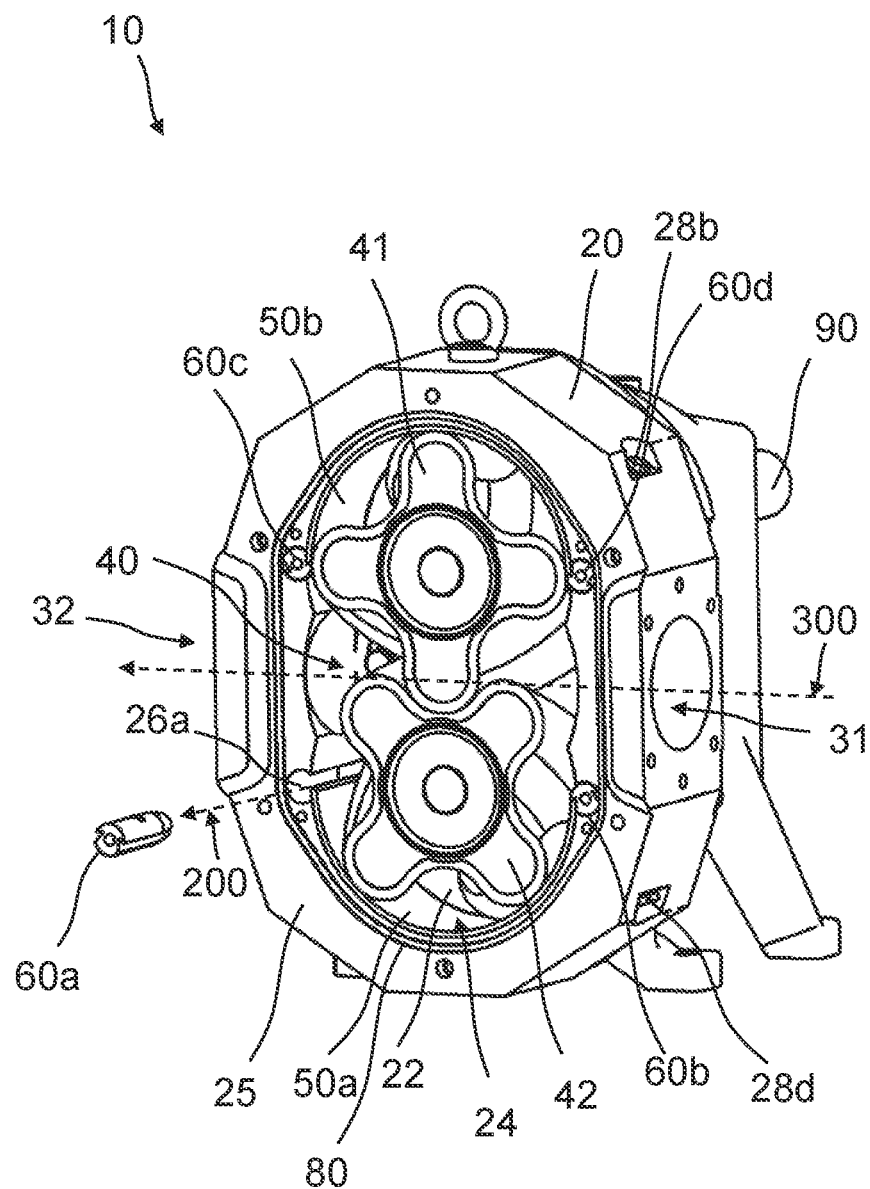
FIG. 2 shows a schematic diagram of a pump with an inserted radial protective element and a removed fastening element.

FIG. 2 shows a schematic diagram of the pump 10 shown in FIG. 1 with an inserted radial protective element 50a. The radial protective element 50a was inserted in the axial direction 200 starting from the state shown in FIG. 1 without the need to remove the rotors 41, 42 from the pump interior 24 for this purpose. The radial protective element 50a is arranged in the position shown in the pump interior 24 and is thus used to line the lower radial section of the pump interior 24. The radial protective element 50a bears against a radial section of the casing inner wall. The fastening element 60b is form-fittingly connected to an edge of the radial protective element 50a and thus holds the radial protective element in the position shown. The second fastening element 60a, which is likewise provided to fasten the radial protective element 50a, is not yet in the fastening position but outside the pump 10 in the position shown.

Figure 3:
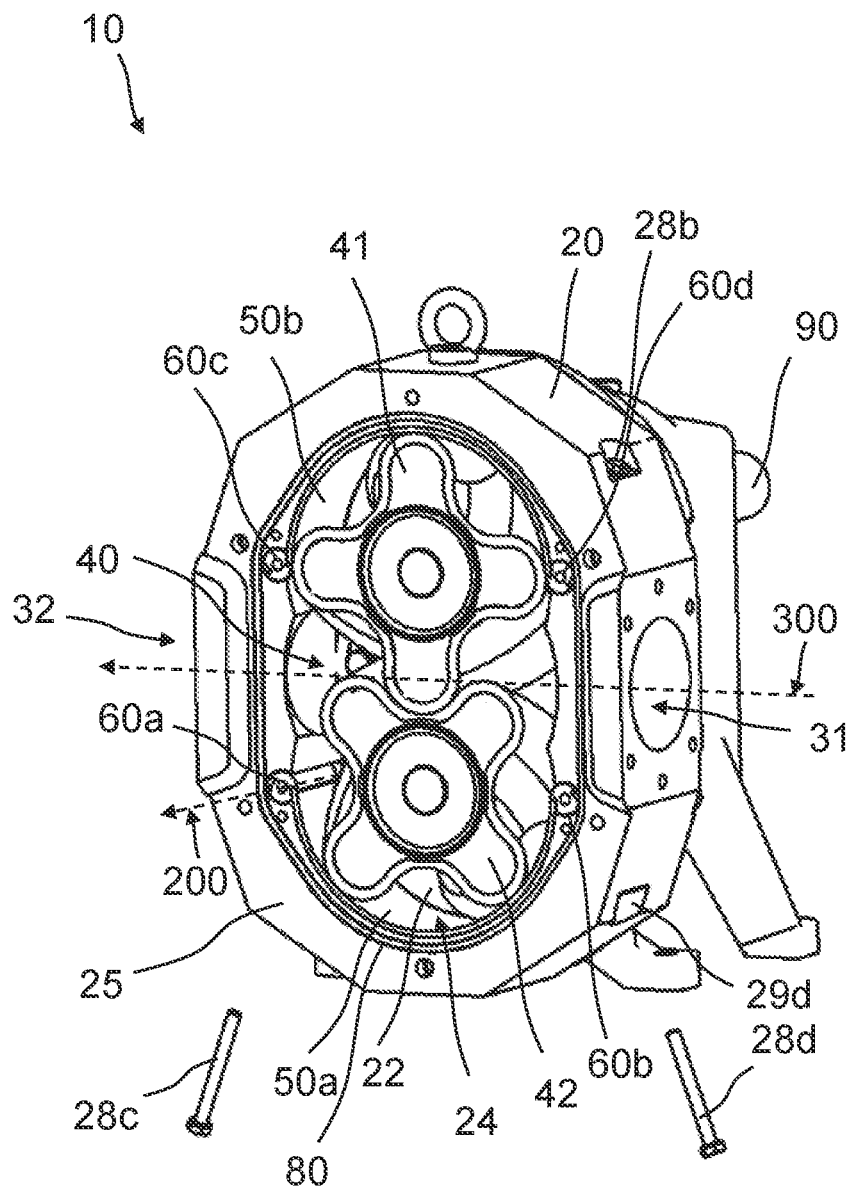
FIG. 3 shows a schematic diagram of a pump with inserted radial protective elements and an inserted fastening element, wherein two screws are not inserted.

FIG. 3 shows a schematic diagram of the pump 10 shown in FIG. 1 and FIG. 2, but now, in contrast to FIG. 2, the last fastening element 60a, which is not yet inserted in the state shown in FIG. 2, is also inserted in the pump 10. In the state shown, both radial protective elements 50a, 50b and the four fastening elements 60a, 60b, 60c, 60d provided to fasten these protective elements are arranged in the pump. The fastening elements 60a, 60b, 60c, 60d are each arranged in a recess in the pump interior 24. Both the fastening elements 60a, 60b, 60c, 60d and the radial protective elements 50a, 50b can be moved out of the pump 10 in the axial direction 200 or parallel to the axial direction. In the position shown, the screws 28c and 28d are not connected to the fastening elements 60a, 60b and therefore in this case these two fastening elements are not yet fixed in the axial direction and these two fastening elements do not yet exert a clamping force on the radial protective element 50a.

Figure 4:
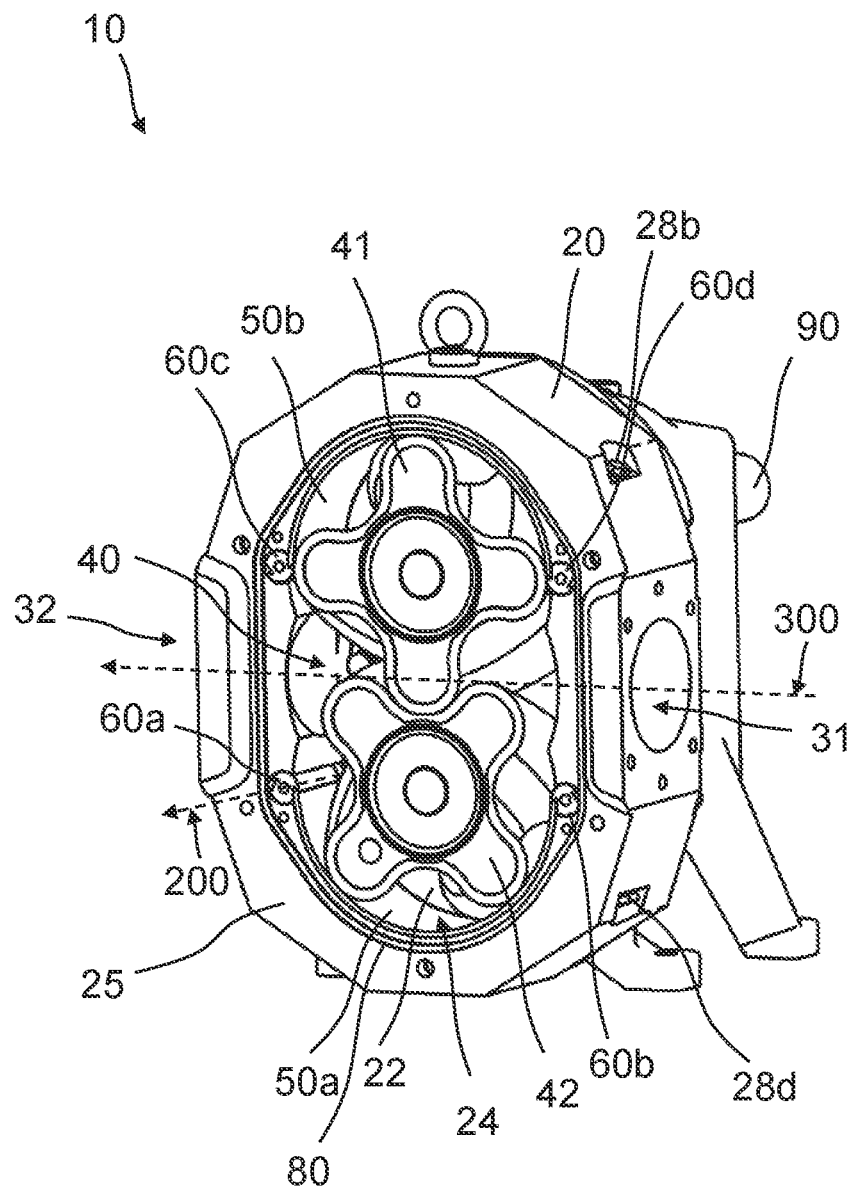
FIG. 4 shows a schematic diagram of a pump with inserted radial protective elements and an inserted fastening element, with inserted screws.

FIG. 4 shows substantially the same diagram as FIG. 3, with the difference that now the two screws 28c and 28d are connected to the fastening elements 60a, 60b and therefore these two fastening elements are now fixed in the axial direction and these two fastening elements exert a clamping force on the radial protective element 50a.

Figure 5:
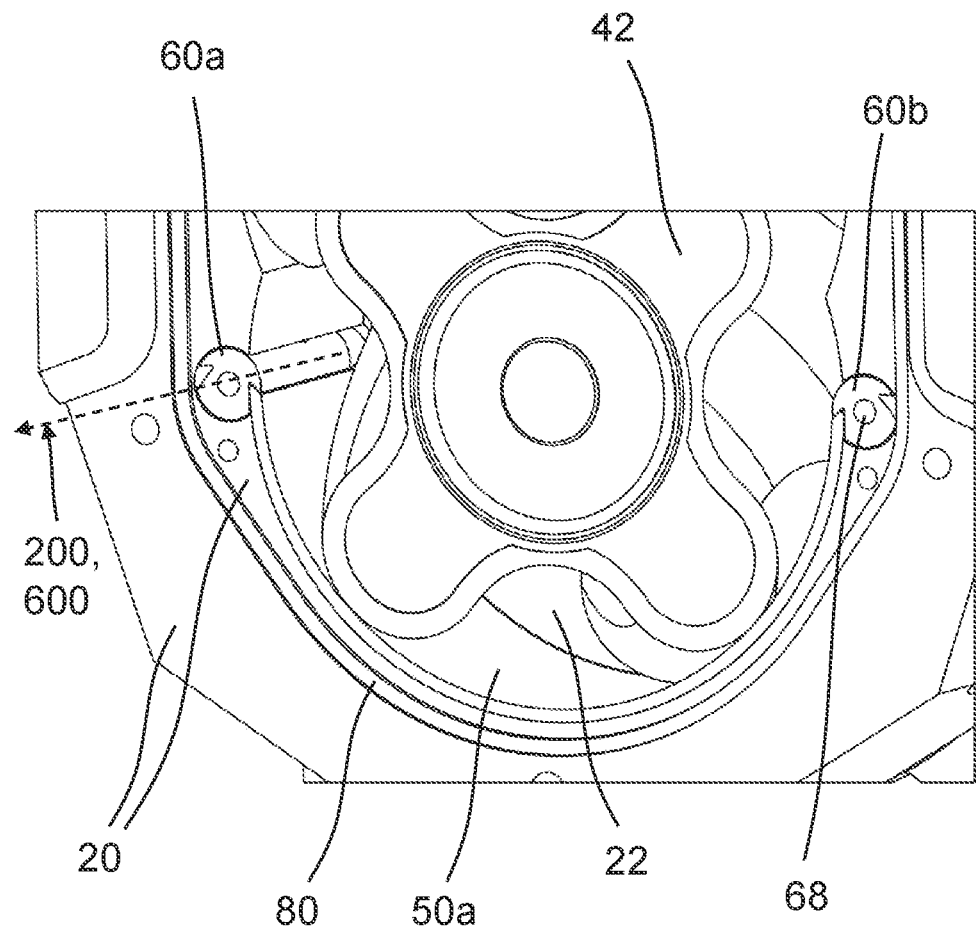
FIG. 5 shows a schematic detail view of the view shown in FIG. 4 in the region of the lower radial protective element.

FIG. 5 shows a schematic detail view of the view shown in FIG. 4 in the region of the lower radial protective element 50a. The fastening elements 60a, 60b are arranged in recesses in the casing 20 which extend along or parallel to the axial direction 200. The radial protective element 50a is fastened to the casing inner wall by the fastening elements 60a, 60b. The fastening elements 60a, 60b are arranged form-fittingly in the recesses 26a, 26b so that the fastening elements 60a, 60b cannot pass out of the recesses 26a, 26b in the direction of the rotor 41. Thanks to the form-fitting connection existing with the fastening elements 60a, 60b, the radial protective element 50a is also held and fastened securely.

Figure 6:
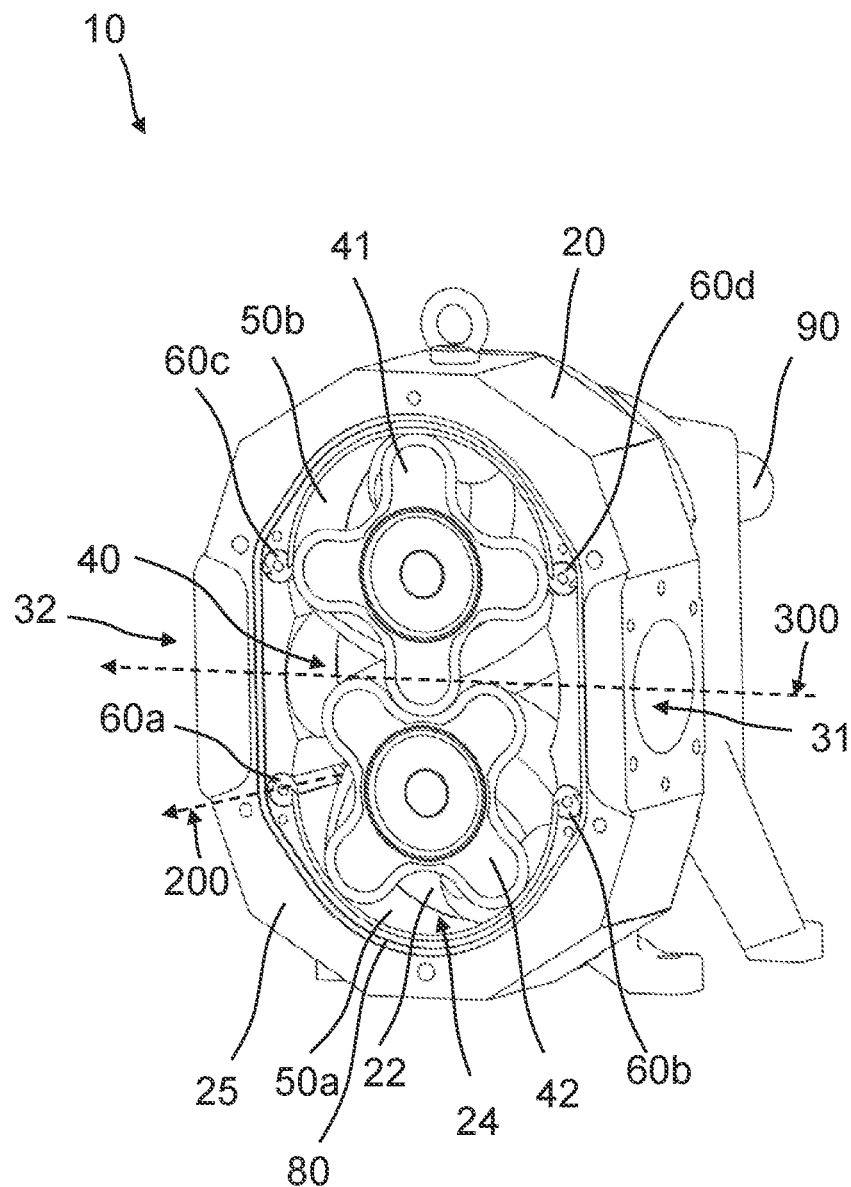
FIG. 6 shows a schematic diagram of a further embodiment of a pump with inserted radial protective elements and an inserted fastening element.

FIG. 6 shows a schematic diagram of a further embodiment of a pump 10 with inserted radial protective elements 50a and an inserted fastening element 60a. In contrast to the exemplary embodiment shown in FIG. 1 to FIG. 5, in this case there are no screws connected to the fastening elements in order to fix the fastening elements and to exert a clamping force on the radial protective elements by means of the fastening elements.

Instead of screws connected to the fastening elements, for example one screw can be provided which is designed to clamp the radial protective element 50a. It is also possible for a further screw to be provided which is designed to clamp the radial protective element 50b. The radial protective elements 50a, 50b can then be clamped by means of this screw such that a clamping force is produced between the radial protective elements and the fastening elements. In this embodiment, screws which run through the casing to the fastening elements are not needed.

Figure 7:
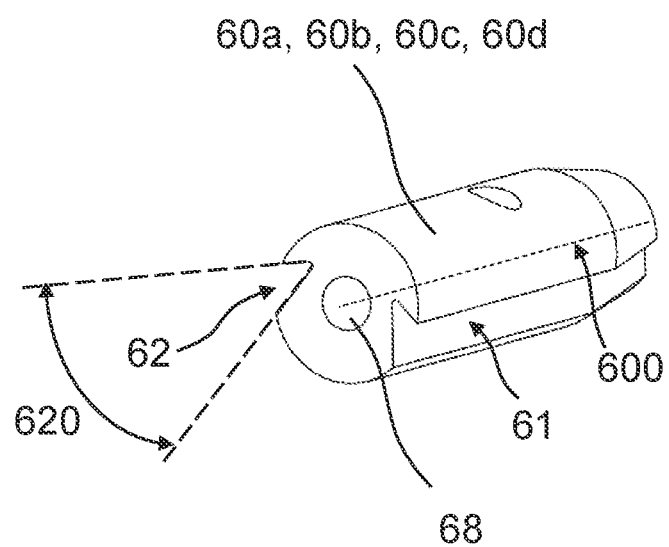
FIG. 7 shows a schematic diagram of a fastening element.

FIG. 7 shows a schematic diagram of a fastening element 60a, 60b, 60c, 60d. The fastening element 60a, 60b, 60c, 60d is rod-shaped and extends along its longitudinal extent 600. The fastening element 60a, 60b, 60c, 60d has two elongate depressions 61, 62, which run parallel to the longitudinal extent 600 of the fastening element. These elongate depressions 61, 62 can receive the edges of the radial protective elements and thus produce a form-fitting connection. The elongate depressions 61, 62 each have an acute angle 620 of less than 90°, as shown schematically here.

The elongate depressions 61, 62 with the acute angle 620 preferably extend in an angle range of 0° to at most 5° relative to the longitudinal extent 600 of the fastening element 60a. When the recesses 26a, 26b in the casing of the pump 10 are not arranged parallel to the axial direction 200 but have an angle of a certain amount to the axial direction, the elongate depressions 61, 62 with the acute angle 620 preferably have an angle to the longitudinal extent 600 corresponding to the angle between the recess 26a, 26b and the axial direction. However, when the recesses 26a, 26b in the casing of the pump 10 are arranged parallel to the axial direction 200, the edges of the radial protective element 50a preferably have an angle which corresponds to the angle between the elongate depressions 61, 62 with the acute angle 620 and the longitudinal extent 600 of the fastening element 60a.

Figure 8:
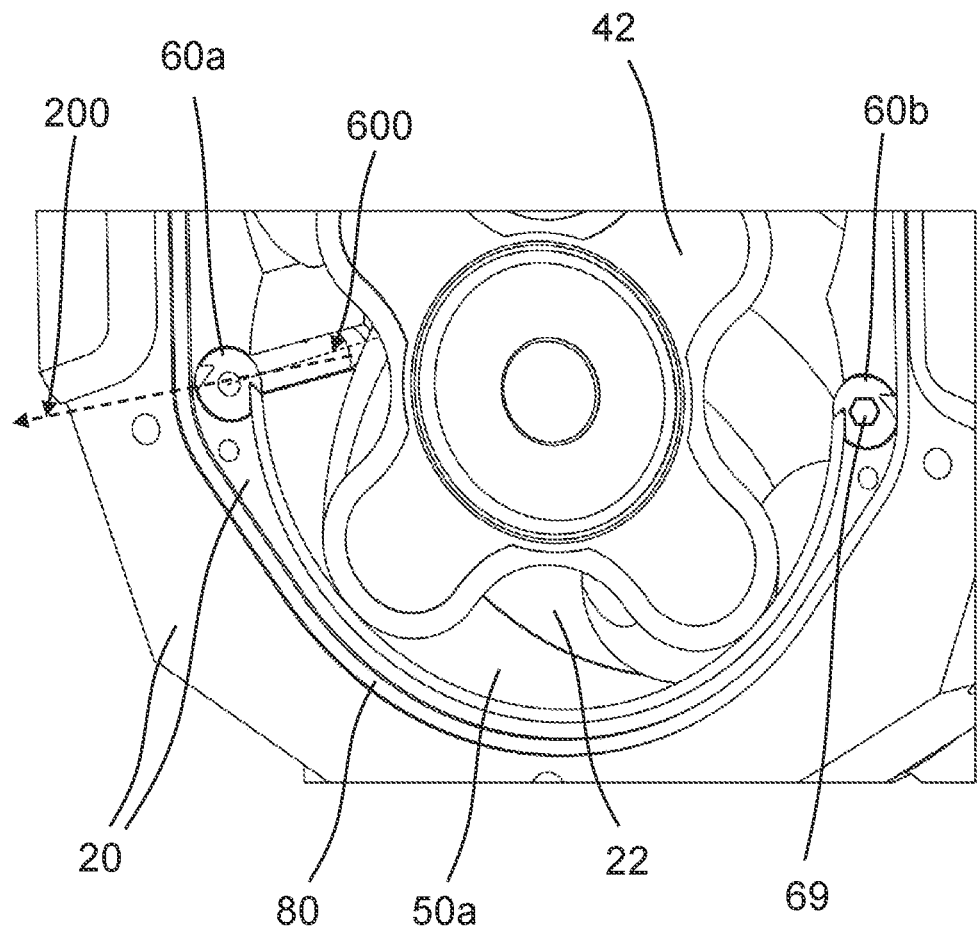
FIG. 8 shows a schematic detail view of a further embodiment of a pump in the region of the lower radial protective element.

FIG. 8 shows a schematic detail view in the region of the lower radial protective element 50a of a further embodiment of a pump. The fastening elements 60a, 60b are arranged in recesses in the casing 20. The radial protective element 50a is fastened to the casing inner wall by the fastening elements 60a, 60b. The fastening elements 60a, 60b are arranged form-fittingly in the recesses so that the fastening elements 60a, 60b cannot pass out of the recesses 26a, 26b in the direction of the rotor 41. Thanks to the form-fitting connection existing with the fastening elements 60a, 60b, the radial protective element 50a is also held and fastened securely.

In the embodiment shown here, the longitudinal extent 600 of the fastening element 60a is not arranged parallel to the axial direction 200. Instead, the longitudinal extent 600 of the fastening element 60a in the embodiment shown here is arranged at angle of approximately 2° relative to the axial direction 200, as shown schematically here. The further fastening element 60a likewise does not run parallel to the axial direction 200 but parallel to the longitudinal extent of the other fastening element 60a. In the embodiment shown here, the recesses 26a, 26b correspondingly likewise do not extend parallel to the axial direction 200 but parallel to the longitudinal extent of the fastening elements 60a, 60b.

Depending on whether the depressions in the fastening element 60a run parallel to the axial direction or not parallel to the axial direction, the edges of the radial protective element 50a can correspondingly run parallel to the axial direction or not parallel to the axial direction.

Such an arrangement allows self-locking of the fastening elements 60, 60b in the recesses 26a, 26b and of the radial protective element 50a in the pump interior 24, in particular self-locking over a sloping plane.

A bore 68 is also provided, which extends through the fastening element 60a along the longitudinal extent 600. A fastening screw 69 can be fed through this bore 68 (a screw head of the screw is shown schematically here in FIG. 8). The fastening screw 69 can be screwed into an internal thread arranged in a blind hole in the casing inner wall on the side of the pump interior 24 opposite the opening in the casing 20, as a result of which the fastening element 60a can be fastened to the casing by means of the fastening screw 69.

The fastening screw 69 can also advantageously effect clamping between the fastening element 60a and the radial protective element 50a. Further screws for fastening the fastening element 60a and for applying a clamping force can then advantageously be omitted.

Figure 9:
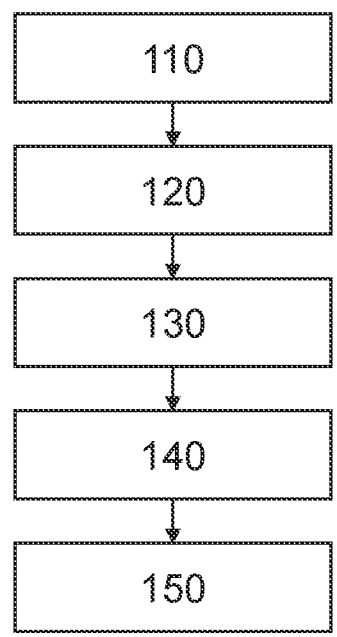
FIG. 9 shows a schematic diagram of an exemplary method sequence for a method for fastening a radial protective element within a pump interior of a pump.

FIG. 9 shows a schematic diagram of an exemplary method sequence for a method 100 for fastening a radial protective element 50a within a pump interior 24 of a pump 10. The method 100 comprises the following steps:

In a step 110, providing a pump 10, in particular a pump as described here, the pump comprising a casing 20 with a casing inner wall 21, a pump interior 24 delimited by the casing inner wall 21, an inlet opening 31 through which fluid can be conveyed into the pump interior 24, an outlet opening 32 through which fluid can be conveyed out of the pump interior 24, a displacement assembly 40 which is arranged in the pump interior 24 and is mounted movably relative to the pump interior 24 and is designed to cause the fluid to be conveyed along a flow direction 300 from the inlet opening 31 to the outlet opening 32.

In a step 120, arranging a radial protective element 50a within the pump interior 24 in order to line at least one radial section of the pump interior 24 so that the radial protective element 50a bears against a radial section of the casing inner wall 21.

In a step 130, introducing a fastening element 60a into a recess 26a in the casing 20, said recess 26a running along the casing inner wall 21 and extending in an axial direction 200 preferably running transversely to the flow direction so that the fastening element 60a extends in the axial direction from a first axial end of the pump interior 24 and the fastening element 60a bears against an edge 51 of the radial protective element 50a. The fastening element 60a extends in the axial direction 200 along the entire pump interior 24 from the first axial end of the pump interior 24 to a second axial end of the pump interior 24 opposite the first axial end. The fastening element 60a is form-fittingly connected to the radial protective element 50a. And the fastening element 60a has along its longitudinal extent an elongate depression 61, which is designed to receive the edge of the radial protective element 50a and thereby to produce a form-fitting connection to the radial protective element 50a.

In a step 140, connecting the fastening element 60a to the casing 20 by means of at least one screw, wherein the at least one screw runs through a casing wall of the casing 20 to the fastening element 60a.

In a step 150, moving the fastening element 60a by means of the at least one screw in the direction of the edge of the radial protective element 50a, as a result of which the fastening element 60a exerts a clamping force on the radial protective element 50a.

The invention claimed is:

1. A pump for conveying a fluid comprising
a casing having a casing inner wall;
a pump interior delimited by the casing inner wall;
an inlet opening through which the fluid adapted to be conveyed into the pump interior;
an outlet opening through which the fluid adapted to be conveyed out of the pump interior;
a displacement assembly arranged in and mounted movably relative to the pump interior and adapted to cause the fluid to be conveyed along a flow direction from the inlet opening to the outlet opening;
a radial protective element arranged in the pump interior and lining at least one radial section of the pump interior, the radial protective element bearing against a radial section of the casing inner wall; and
a first fastening element arranged in a fastening position in which the first fastening element bears against an edge of the radial protective element and thereby fastens the radial protective element within the pump interior, wherein the first fastening element has a longitudinal extent extending from a first axial end of the pump interior along a recess disposed in the casing inner wall;
wherein the first fastening element is rod-shaped and the longitudinal extent of the first fastening element is greater than a diameter of the first fastening element by at least one multiple.

2. The pump according to claim 1, wherein the longitudinal extent of the first fastening element extends along the entire pump interior from the first axial end of the pump interior to a second axial end of the pump interior opposite the first axial end.

3. The pump according to claim 1, wherein the longitudinal extent of the first fastening element is arranged in an angle range of 0° to at most 5° relative to an axial direction running transversely to the flow direction, and wherein the recess extends parallel to the longitudinal extent of the first fastening element.

4. The pump according to claim 3, wherein the edge of the radial protective element is arranged in an angle range of 0° to at most 5° relative to the axial direction, and wherein the edge extends parallel to the longitudinal extent of the first fastening element.

5. The pump according to claim 1, wherein the longitudinal extent of the first fastening element extends in an axial direction running transversely to the flow direction, and wherein the recess extends in the axial direction.

6. The pump according to claim 1, wherein the first fastening element is detachably connectable to the casing by a screw connection and is movable out of the pump and out of the recess in the casing in an axial direction when in a non-screwed state, and wherein the first fastening element is form-fittingly connected to the recess in the casing transversely to the axial direction.

7. The pump according to claim 1, wherein in the first fastening element is form-fittingly connected to the radial protective element and the first fastening element further comprises an elongate depression along its longitudinal extent, the elongate depression being adapted to receive the edge of the radial protective element and thereby produce a form-fitting connection to the radial protective element.

8. The pump according to claim 1, wherein:
the first fastening element is connected to the casing by at least one screw, the at least one screw running through a casing wall of the casing to the first fastening element;
the first fastening element is movable in the direction of the edge of the radial protective element by the at least one screw, as a result of which the first fastening element exerts a clamping force on the radial protective element; and
the longitudinal axis of the at least one screw is arranged orthogonally to the longitudinal extent of the first fastening element.

9. The pump according to claim 8, wherein the first fastening element is movable by the at least one screw between the fastening position, in which the first fastening element exerts a clamping force on the radial protective element, and a release position, in which the first fastening element does not exert any clamping force on the radial protective element.

10. The pump according to claim 1, wherein the first fastening element further comprises a bore which extends through the first fastening element along the longitudinal extent of the first fastening element, and wherein a fastening screw is disposed in the bore in the first fastening element, the fastening screw being detachably connected to the casing comprising a blind bore disposed in an axial casing inner wall having an internal thread.

11. The pump according to claim 1, wherein the first fastening element further comprises at least one elongate depression along its longitudinal extent adapted to receive the edge of the radial protective element and thereby to produce a form-fitting connection to the radial protective element, and the at least one elongate depression extends in an angle range of 0° to at most 5° relative to the longitudinal extent of the first fastening element.

12. The pump according to claim 11, wherein the first fastening element further comprises a substantially circular cross-section with at least one notch therein formed by the at least one elongate depression.

13. The pump according to claim 12, wherein the first fastening element comprises two elongate depressions along its longitudinal extent each adapted to receive the edge of the radial protective element and thereby to produce a form-fitting connection to the radial protective element, and the first fastening element has two notches which are formed by the two elongate depressions arranged in mirror-symmetry.

14. The pump according to claim 1, further comprising a second fastening element extending in the axial direction from the first axial end of the pump interior along a second recess arranged in the casing inner wall, wherein the first fastening element and the second fastening element are arranged parallel or designed identically.

15. The pump according to claim 14, wherein the second fastening element is detachably connectable to the casing by a screw connection, and in a non-screwed state is movable out of the pump and out of the second recess in the casing in the axial direction, wherein the second fastening element is form-fittingly connected to the radial protective element, and wherein the first fastening element and the second fastening element each have an elongate depression along their respective longitudinal extents, each of the elongate depressions being adapted to receive the edge of the radial protective element and thereby to produce a form-fitting connection to the radial protective element.

16. The pump according to claim 1, wherein the pump has two radial protective elements, a first radial protective element being arranged in a first radial region of the pump chamber and a second radial protective element being arranged in a second radial region of the pump chamber, and wherein each of the first and second protective elements is fastened in the pump interior with two fastening elements.

17. The pump according to claim 1, wherein the pump is a lobe pump, and the displacement assembly comprises a first rotor rotatably mounted about a first rotational axis within the pump interior and a second rotor rotatably mounted about a second rotational axis within the pump interior, wherein the first rotor and the second rotor engage in one another between the first rotational axis and the second rotational axis, and wherein the first rotational axis and the second rotational axis are arranged parallel to the axial direction.

18. A fastening element for fastening a radial protective element within a pump interior of a pump for conveying a fluid comprising:
a casing having a casing inner wall;
the pump interior delimited by the casing inner wall;
an inlet opening through which the fluid is adapted to be conveyed into the pump interior;
an outlet opening through which the fluid is adapted to be conveyed out of the pump interior; and
a displacement assembly arranged in and mounted movably relative to the pump interior and adapted to cause the fluid to be conveyed along a flow direction from the inlet opening to the outlet opening;
wherein the radial protective element is arranged in the pump interior and lines at least one radial section of the pump interior, the radial protective element bearing against a radial section of the casing inner wall; and
wherein the fastening element is rod-shaped and has a substantially circular cross section with at least one notch formed by an elongate depression adapted to receive an edge of the radial protective element.

19. The fastening element of claim 18, wherein the fastening element comprises two notches formed by two elongate depressions in mirror-symmetry, each notch adapted to receive the edge of the radial protective element.

20. The use of a fastening element according to claim 18 in a lobe pump designed to convey liquids containing solids.

21. A protective element system for lining a radial section of a pump interior of a pump for conveying a fluid comprising:
a casing having a casing inner wall;
the pump interior delimited by the casing inner wall;
an inlet opening through which the fluid is adapted to be conveyed into the pump interior;
an outlet opening through which the fluid is adapted to be conveyed out of the pump interior; and
a displacement assembly arranged in and mounted movably relative to the pump interior and adapted to cause the fluid to be conveyed along a flow direction from the inlet opening to the outlet opening;
at least two fastening elements comprising a notch formed by an elongate depression along their respective longitudinal extents; and at least one radial protective element comprising two edges which run in the axial direction adapted to be received in the elongate depressions of one of the two fastening elements;

wherein the notch formed by the elongate depression has an opening angle of less than 90° in cross section or the edges of the radial protective element have an edge angle of less than 90° in cross section, and wherein the opening angle and the edge angle are equal, whereby the edges of the radial protective element are arranged in the elongate depression to produce a form-fitting connection.

22. The use of a protective element system according to claim 21 in a lobe pump designed to convey liquids containing solids.

23. A method for fastening a radial protective element within a pump interior of a pump comprising the steps of:
providing the pump comprising a casing with a casing inner wall, the pump interior delimited by the casing inner wall, an inlet opening through which a fluid is adapted to be conveyed into the pump interior, an outlet opening through which the fluid is adapted to be conveyed out of the pump interior, a displacement assembly arranged in the pump interior and moveably mounted relative to the pump interior and adapted to cause the fluid to be conveyed along a flow direction from the inlet opening to the outlet opening;
arranging the radial protective element within the pump interior to line at least one radial section of the pump interior so that the radial protective element bears against a radial section of the casing inner wall; and
introducing a fastening element into a recess in the casing, the recess running along the casing inner wall and extending in an axial direction running transversely to the flow direction so that the fastening element extends in the axial direction from a first axial end of the pump interior and the fastening element bears against an edge of the radial protective element;

wherein the fastening element is rod-shaped and the longitudinal extent of the fastening element is greater than a diameter of the fastening element by at least one multiple.

24. The method according to claim 23, further comprising the steps of:
connecting the fastening element to the casing by at least one screw, wherein the at least one screw runs through a casing wall of the casing to the fastening element or through a bore along a longitudinal extent of the fastening element.

25. The method according to claim 24, wherein the at least one screw runs through a casing wall of the casing to the fastening element, and wherein the fastening element is moved by the at least one screw in the direction of the edge of the radial protective element, as a result of which the fastening element exerts a clamping force on the radial protective element.

26. The method according to claim 23, wherein the fastening element extends in the axial direction along the entire pump interior from the first axial end of the pump interior to a second axial end of the pump interior opposite the first axial end, wherein the fastening element is form-fittingly connected to the radial protective element, and wherein the fastening element has an elongate depression along its longitudinal extent adapted to receive the edge of the radial protective element and thereby to produce a form-fitting connection to the radial protective element.

27. The method according to claim 23, further comprising the step of:
pulling the fastening element out of the recess in the casing in the axial direction;
removing the radial protective element from the pump interior in the axial direction; or
removing the displacement assembly from the pump interior in the axial direction.

* * * * *